US012224106B2

(12) United States Patent
Wang et al.

(10) Patent No.: US 12,224,106 B2
(45) Date of Patent: Feb. 11, 2025

(54) INDUCTIVE COMPONENT AND MANUFACTURING METHOD THEREFOR

(71) Applicant: Shenzhen Sunlord Electronics Co., Ltd., Guangdong (CN)

(72) Inventors: Yingying Wang, Guangdong (CN); Xinshu Yu, Guangdong (CN); Shengcheng Xia, Guangdong (CN); Youyun Li, Guangdong (CN)

(73) Assignee: Shenzhen Sunlord Electronics Co., Ltd., Guangdong (CN)

( * ) Notice: Subject to any disclaimer, the term of this patent is extended or adjusted under 35 U.S.C. 154(b) by 713 days.

(21) Appl. No.: 17/211,789

(22) Filed: Mar. 24, 2021

(65) Prior Publication Data

US 2021/0327640 A1 Oct. 21, 2021

Related U.S. Application Data

(63) Continuation of application No. PCT/CN2020/085951, filed on Apr. 21, 2020.

(51) Int. Cl.
*H01F 27/28* (2006.01)
*H01F 27/02* (2006.01)
(Continued)

(52) U.S. Cl.
CPC ....... *H01F 27/2823* (2013.01); *H01F 27/022* (2013.01); *H01F 27/29* (2013.01); *H01F 41/0246* (2013.01); *H01F 41/10* (2013.01)

(58) Field of Classification Search
CPC .... H01F 27/2823; H01F 27/022; H01F 27/29; H01F 27/292; H01F 2017/048; H01F 17/04; H01F 27/28; H01F 27/34
See application file for complete search history.

(56) References Cited

U.S. PATENT DOCUMENTS 4,546,210 A * 10/1985 Akiba .................... H01B 7/303
174/DIG. 26
4,549,042 A * 10/1985 Akiba ...................... H01B 7/30
174/114 R (Continued)

FOREIGN PATENT DOCUMENTS

CN 101859641 A 10/2010
CN 102171771 8/2011

(Continued)

*Primary Examiner* — Mang Tin Bik Lian
(74) *Attorney, Agent, or Firm* — Winston Hsu

(57) ABSTRACT

An inductive component comprises a hollow coil wound by Litz wire, a magnetic plastic packaging layer covering the coil, and a first electrode and a second electrode of the coil. The first electrode and the second electrode are exposed outside the magnetic plastic packaging layer. A manufacturing method for the inductive component comprises: winding a hollow coil by using Litz wire; connecting two leading-out terminals of the coil to portions of a leadframe to be formed into two electrodes; manufacturing a formed magnetic plastic packaging layer on the periphery of the coil; curing the magnetic plastic packaging layer through heat treatment; and carrying out leadframe cutting on the cured semi-finished product to form the two electrodes exposed outside the magnetic plastic packaging layer, and bending the two electrodes to flatly extend to the surface of the magnetic plastic packaging layer.

8 Claims, 3 Drawing Sheets

(51) Int. Cl.
*H01F 27/29* (2006.01)
*H01F 41/02* (2006.01)
*H01F 41/10* (2006.01)

(56) References Cited

U.S. PATENT DOCUMENTS

| | | | | |
|---|---|---|---|---|
| 9,805,860 | B2* | 10/2017 | Hsieh | H01F 27/29 |
| 2010/0182114 | A1 | 7/2010 | Huang | |
| 2012/0080970 | A1* | 4/2012 | Yin | H01B 7/29<br>977/773 |
| 2013/0265127 | A1* | 10/2013 | Koeda | H01F 1/24<br>420/95 |
| 2014/0002227 | A1* | 1/2014 | Hsieh | H01F 5/003<br>336/200 |
| 2016/0247626 | A1* | 8/2016 | Kawarai | H01F 27/2823 |
| 2016/0351323 | A1* | 12/2016 | Wakamori | H01F 17/041 |
| 2017/0053732 | A1* | 2/2017 | Moon | H01F 17/04 |
| 2018/0012699 | A1* | 1/2018 | Arimitsu | H01F 27/24 |
| 2018/0226184 | A1* | 8/2018 | Kudo | H01F 41/04 |
| 2018/0286553 | A1* | 10/2018 | Kobayashi | H01F 17/045 |
| 2019/0304659 | A1* | 10/2019 | Tonogai | H01F 27/2823 |
| 2019/0341178 | A1 | 11/2019 | Zushi | |
| 2019/0392977 | A1* | 12/2019 | Kawarai | H01F 27/00 |

FOREIGN PATENT DOCUMENTS

| | | | |
|---|---|---|---|
| CN | 102856037 | | 1/2013 |
| CN | 103295754 | A | 9/2013 |
| CN | 103714945 | A | 4/2014 |
| CN | 104025706 | A | 9/2014 |
| CN | 104332299 | | 2/2015 |
| CN | 105895307 | A | 8/2016 |
| CN | 105917424 | A | 8/2016 |
| CN | 108389679 | | 8/2018 |
| CN | 210039838 | U | 2/2020 |
| JP | 6035378 | B1 | 11/2016 |
| WO | 2019/017236 | A1 | 1/2019 |

* cited by examiner

INDUCTIVE COMPONENT AND MANUFACTURING METHOD THEREFOR

CROSS REFERENCE TO RELATED APPLICATIONS

This application is a continuation application of PCT/CN2020/085951 filed on 2020 Apr. 21. The contents of the above-mentioned application are all hereby incorporated by reference.

BACKGROUND OF THE INVENTION

1. Field of the Invention

The invention relates to an inductive component and a manufacturing method therefor.

2. Description of the Prior Art

With the development trend of IC and 5G to high frequency and low power consumption, power inductors of high frequency, heavy current, and low loss are favored by the market. The conventional power inductor adopts the round wire or flat wire to wind a hollow coil, and often has the defects of high high-frequency alternating-current load loss, high winding temperature rise, low alternating-current voltage withstanding, and the like during use. The main reason is that the conventional power inductor mainly depends on reducing the copper loss and the magnetic core loss of the round wire (flat wire) to optimize the inductor loss, but due to the skin effect and the adjacent effect of the round wire (flat wire) at high frequency, it is difficult to make a great breakthrough to optimize the power consumption of the power inductor by simply increasing the wire diameter of round wire and flat wire and improving the structure of the hollow coil wound by round wire and flat wire. Although currently the conventional power inductor can reduce the skin effect by increasing the width-to-thickness ratio of the flat wire, when the width-to-thickness ratio of the flat wire is greater than 15, the bending force of the flat wire is large when being wound, and surface cracking is easily caused especially when the bending radius is small.

According to the conventional integrally formed inductor, the coil is pressed in a cold pressing or hot pressing mode with the pressure reaching more than 900 MPa. Therefore, the coil with a thin wire diameter is easy to be broken under such pressure, and an open circuit phenomenon is easy to occur.

The disclosure of the above background art is only used for assisting in understanding the inventive concept and technical scheme of the present invention, and does not necessarily belong to the prior art of the present patent application. Insofar as there is no explicit evidence that the above-mentioned content has been disclosed before the filing date of the present patent application, the above-mentioned background art should not be used for evaluating the novelty and inventive step of the present application.

SUMMARY OF THE INVENTION

The invention mainly aims to overcome the above defects in the prior art and provides an inductive component and a manufacturing method therefor to reduce the alternating current impedance and high-frequency loss of a power inductive component.

In order to achieve the above object, the invention adopts the following technical scheme.

An inductive component comprises a hollow coil wound by Litz wire, a magnetic plastic packaging layer covering the coil, and a first electrode and a second electrode which are respectively connected to a first leading-out terminal and a second leading-out terminal of the coil. The first electrode and the second electrode are exposed outside the magnetic plastic packaging layer.

Further, the Litz wire is formed by twisting a plurality of self-adhesive wires insulated from each other, and the self-adhesive wire comprises a copper conductor, an insulating layer coated on the surface of the copper conductor, and a self-adhesive layer coated on the outer surface of the insulating layer; preferably, the insulating layer is a polyurethane, polyester or polyester imide primer layer; preferably, the self-adhesive layer is a polyimide self-adhesive layer or a polyamide self-adhesive layer.

Further, the coil is formed by opposing winding of the Litz wire, the coil comprises a first coil layer and a second coil layer, the first coil layer and the second coil layer are arranged to overlap each other, and winding directions of the first coil layer and the second coil layer are opposite.

Further, the magnetic plastic packaging layer comprises magnetic powder particles, an organic adhesive, a lubricant, and a curing agent; the magnetic powder particles comprise particles of any one or more of Mn—Zn, NiZn, carbonyl iron powder, Fe—Ni, FeSi, FeSiCr, FeSiAl, molybdenum permalloy, nanocrystalline and amorphous materials, and preferably particle size of the magnetic powder particles is 1-50 μm; the organic adhesive comprises any one or more of epoxy resin, silicon resin, furfural resin, polyimide, polyphenylene sulfide, and melamine resin; the lubricant comprises any one or more of stearic acid, aluminum stearate, magnesium stearate, calcium stearate, and zinc stearate; preferably, the curing agent is amino resin.

Further, the magnetic plastic packaging layer comprises a top surface, a bottom surface, a first side surface and a second side surface opposite to the first side surface, wherein the first electrode is connected to the first leading-out terminal of the coil by penetrating through the first side surface, the second electrode is connected to the second leading-out terminal of the coil by penetrating through the second side surface, the first electrode extends downwards on the first side surface to form a side surface electrode portion of the first electrode and is bent to extend on the bottom surface to form a bottom surface electrode portion of the first electrode, and the second electrode extends downwards on the second side surface to form a side surface electrode portion of the second electrode and is bent to extend on the bottom surface to form a bottom surface electrode portion of the second electrode; preferably, the inductive component is a cube.

Further, the bottom surface of the magnetic plastic packaging layer is formed with a first bottom surface electrode groove and a second bottom surface electrode groove, wherein the bottom surface electrode portion of the first electrode is accommodated in the first bottom surface electrode groove, and the bottom surface electrode portion of the second electrode is accommodated in the second bottom surface electrode groove, thereby keeping the magnetic plastic packaging layer flat with the first electrode and the second electrode.

A manufacturing method for the inductive component, comprising the following steps:

a. winding a hollow coil by using Litz wire;

b. connecting two leading-out terminals of the coil to portions of the leadframe to be formed into two electrodes;

c, manufacturing and molding a magnetic plastic packaging layer on the periphery of the coil;

d. curing the magnetic plastic packaging layer through heat treatment; and e. carrying out leadframe cutting on the cured semi-finished product to form the two electrodes exposed outside the magnetic plastic packaging layer, and bending the two electrodes to extend to the surface of the magnetic plastic packaging layer flatly to obtain the inductive component.

Further, in step b, the insulating layer and self-adhesive layer of the leading-out terminal of the coil are removed by means of laser scanning, and then the leading-out terminal of the coil and the portions of the leadframe to be formed into two electrodes are welded by means of laser spot welding; preferably, the leadframe adopts a laser melting leadframe, and the leadframe is coated on the leading-out terminal of the coil before welding; or in step b, the leadframe is provided with an ox-horn locking groove, the insulating layer and self-adhesive layer of the leading-out terminal of the coil are removed by means of laser scanning, then the leading-out terminal of the coil is implanted into the ox-horn locking groove of the leadframe, and then the blade of the ox-horn locking groove is bent by mechanical pressure to wrap the leading-out terminal of the coil.

Further, in step c, the magnetic plastic packaging layer is formed by molding or gluing, preferably, the molding is transfer molding.

Further, in step c, the molding pressure is less than 300 MPa; in step d, baking is carried out for 1-5 hours at a temperature above 100° C.

The invention has the following beneficial effects:

The inductive component of the invention comprises a hollow coil wound by Litz wire and a magnetic plastic packaging layer covered on the coil so that the skin effect and adjacent effect of a conductor under the action of a high-frequency magnetic field can be reduced, the alternating current impedance can be effectively restrained, and the high-frequency loss can be reduced.

Specifically, the inductive component of the invention has the following advantages:

Instead of the conventional round wire and flat wire, the self-adhesive Litz wire is adopted to wind a coil so that the contact area of the bonding portion of the self-adhesive enameled copper wire is increased, the coil is not easy to loosen and deform, the skin effect among the coils is small, and the loss is low.

The hollow coil is coated by molding, in particular transfer molding with small molding pressure so that the scenario that the self-adhesive enameled copper wire with thin wire diameter (0.01-0.3 mm) will bear large pressure in the molding process, causing the copper wire to break can be avoided, and the risk of open circuit and short circuit of the product is greatly reduced.

DETAILED DESCRIPTION

Figure 1:
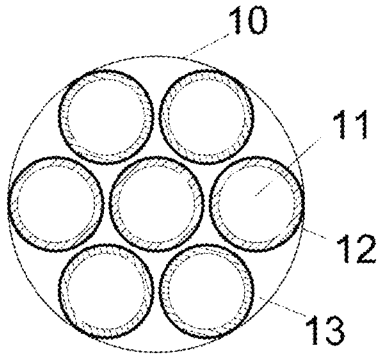
FIG. 1 is a schematic cross-sectional view of a Litz wire in an embodiment provided by the present invention.

Hereinafter, implementations of the present invention will be described in detail. It should be emphasized that the following description is exemplary only and is not intended to limit the scope and the application of the present invention.

It should be noted that when an element is referred to as being "secured to" or "disposed on" another element, it can be directly or indirectly on another element. When one element is referred to as being "connected to" another element, it can be directly or indirectly connected to another element. In addition, the connection may be for either fixation or coupling or communication.

It should be understood that terms "length", "width", "upper", "lower", "front", "rear", "left", "right", "vertical", "horizontal", "top", "bottom", "inner", "outer", etc. indicate the orientation or positional relationship based on the orientation or positional relationship shown in the drawings, and are only for the convenience of describing the embodiments of the present invention and simplifying the description, rather than indicating or implying that the device or element must have a specific orientation or be constructed and operated in a specific orientation, and therefore cannot be understood as a limitation of the present invention.

Furthermore, the terms "first" and "second" are used for descriptive purposes only and cannot be construed as indicating or implying relative importance or implicitly specifying the number of technical features indicated. Therefore, features defined by "first" and "second" may explicitly or implicitly include one or more such features. In the description of the embodiments of the invention, "plurality" means two or more, unless specifically defined otherwise.

Figure 3:
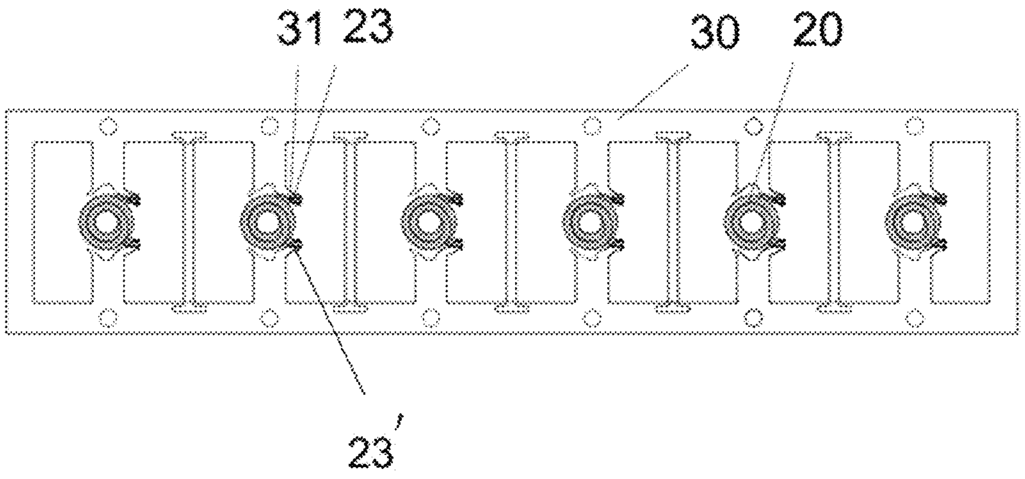
FIG. 3 is a schematic view of a hollow coil welded to a leadframe according to an embodiment provided by the present invention.
Figure 4:
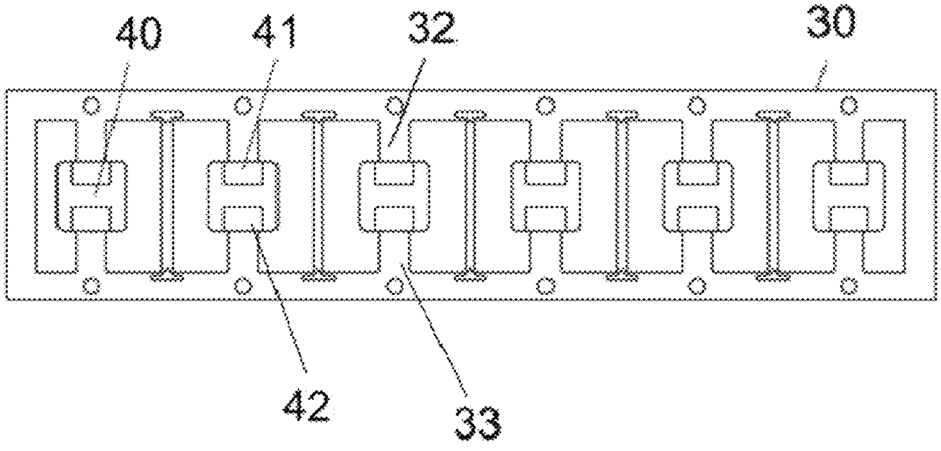
FIG. 4 is a schematic view showing a semi-finished product of a molded hollow coil of Litz wire according to an embodiment provided by the present invention.
Figure 5:
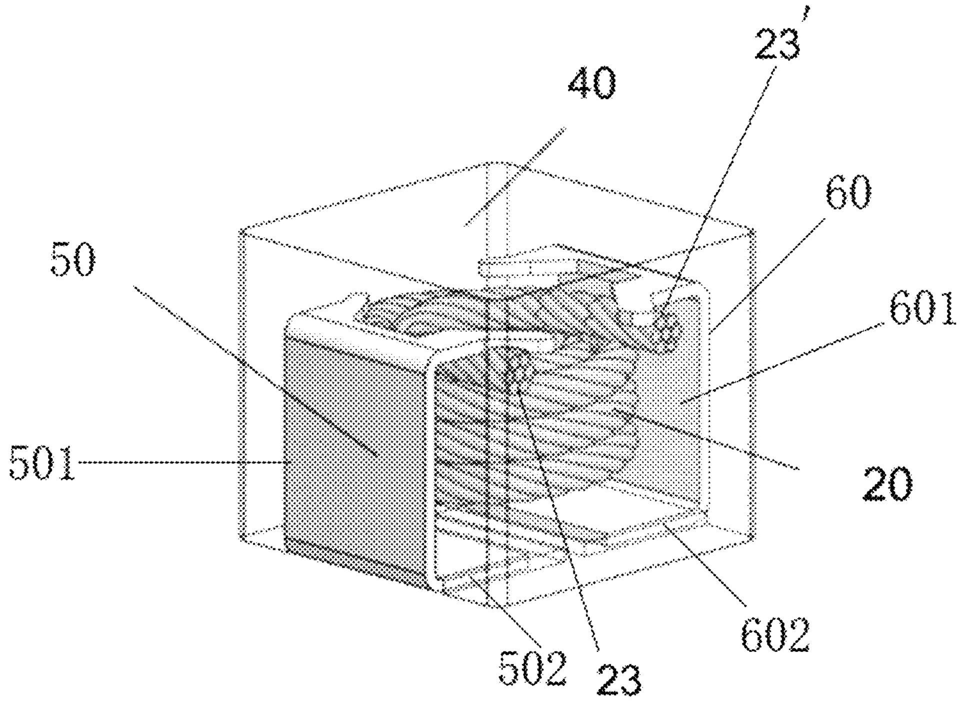
FIG. 5 is a schematic view showing the structure of an inductive component according to an embodiment provided by the present invention.

Referring to FIGS. 1-5, embodiments of the present invention provide an inductive component. FIG. 5 is a schematic view showing a finished product of an embodiment provided by the present invention. As shown in FIG. 5, the inductive component comprises a hollow coil 20 wound by Litz wire 10, a magnetic plastic packaging layer 40 covering the coil 20, and a first electrode 50 and a second electrode connected to a first leading-out terminal 23 and a second leading-out terminal 23' of the coil 20 respectively. The first electrode 50 and the second electrode 60 are exposed outside the magnetic plastic packaging layer 40.

FIG. 1 is a schematic cross-sectional view of a Litz wire in an embodiment provided by the present invention. As shown in FIG. 1, in a preferred embodiment, the Litz wire 10 is formed by twisting a plurality of self-adhesive wires insulated from each other. The self-adhesive wire comprises a copper conductor 11, an insulating layer 12 coated on the surface of the copper conductor 11, and a self-adhesive layer 13 coated on the outer surface of the insulating layer 12; preferably, the insulating layer 12 is a polyurethane, polyester or polyester imide primer layer; preferably, the self-adhesive layer 13 is a polyimide self-adhesive layer 13 or a polyamide self-adhesive layer 13.

Figure 2:
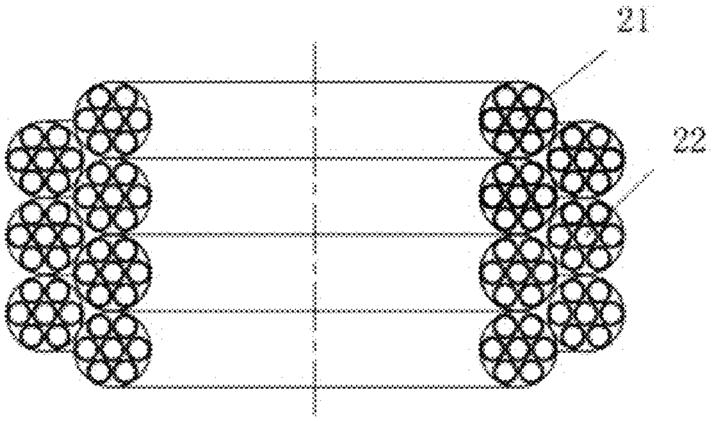
FIG. 2 is a schematic cross-sectional view of a Litz wire wound hollow coil according to an embodiment provided by the present invention.

FIG. 2 is a schematic cross-sectional view of a Litz wire wound hollow coil 20 according to an embodiment provided by the present invention. As shown in FIG. 2, in a preferred embodiment, the coil 20 is formed by opposing winding of the Litz wire 10. The coil 20 includes a first coil layer 21 and a second coil layer 22, the first coil layer 21 and the second coil layer 22 are arranged to overlap each other, and the winding directions of the first coil layer 21 and the second coil layer 22 are opposite.

In a preferred embodiment, the magnetic plastic packaging layer 40 comprises magnetic powder particles, an organic adhesive, a lubricant, and a curing agent.

In some embodiments, the magnetic powder particles comprise particles of any one or more of Mn—Zn, NiZn, carbonyl iron powder, Fe—Ni, FeSi, FeSiCr, FeSiAl, molybdenum permalloy, nanocrystalline and amorphous materials. Preferably, the magnetic powder particles have a particle size of 1 to 50 μm.

In some embodiments, the organic adhesive comprises any one or more of epoxy, silicon resin, furfural resin, polyimide, polyphenylene sulfide, and melamine resin.

In some embodiments, the lubricant comprises any one or more of stearic acid, aluminum stearate, magnesium stearate, calcium stearate, and zinc stearate.

In a preferred embodiment, the curing agent is an amino resin.

FIG. 5 is a schematic view showing the structure of an inductive component according to an embodiment provided by the present invention. As shown in FIG. 5, in a preferred embodiment, the magnetic plastic packaging layer 40 includes a top surface, a bottom surface, a first side surface and a second side surface opposite to the first side. The first electrode 50 is connected to the first leading-out terminal 23 of the coil 20 by penetrating through the first side surface. The second electrode 60 is connected to the second leading-out terminal 23' of the coil 20 by penetrating through the second side surface. The first electrode 50 extends downwards at the first side surface to form a side surface electrode portion 501 of the first electrode 50, and the first electrode 50 is bent to extend at the bottom surface to forma bottom surface electrode portion 502 of the first electrode 50. The second electrode 60 extends downwards at the second side surface to form a side surface electrode portion 601 of the second electrode 60, and the second electrode 60 is bent to extend at the bottom surface to form a bottom surface electrode portion 602 of the second electrode 60. Preferably, the inductive component is a cube.

As shown in FIG. 5, in a further preferred embodiment, the bottom surface of the magnetic plastic packaging layer 40 is formed with a first bottom surface electrode groove 41 and a second bottom surface electrode groove 42, the bottom surface electrode portion 501 of the first electrode 50 is accommodated in the first bottom surface electrode groove 41, and the bottom surface electrode portion 601 of the second electrode 60 is accommodated in the second bottom surface electrode groove 42. Therefore, the magnetic plastic packaging layer 40 and the first electrode 50 and the second electrode 60 are kept flat.

Referring to FIG. 5, in another preferred embodiment, the first side surface of the magnetic plastic packaging layer 40 is formed with a first side surface electrode groove, the second side surface of the magnetic plastic packaging layer 40 is formed with a second side surface electrode groove, the bottom surface of the magnetic plastic packaging layer 40 is formed with a first bottom surface electrode groove 41 and a second bottom surface electrode groove 42, the side surface electrode portion 501 of the first electrode 50 is accommodated in the first side surface electrode groove, the bottom surface electrode portion 502 of the first electrode 50 is accommodated in the first bottom surface electrode groove 41, the side surface electrode portion 601 of the second electrode 60 is accommodated in the second side surface electrode groove, and the bottom surface electrode portion 602 of the second electrode 60 is accommodated in the second bottom surface electrode groove 42. Therefore, the magnetic plastic packaging layer 40 and the first electrode 50 and the second electrode 60 are kept flat.

Referring to FIGS. 1 to 5, the embodiment of the present invention also provides a manufacturing method for the inductive component, which comprises the following steps:

a. winding a hollow coil 20 by using Litz wire 10;
b. connecting two leading-out terminals of the coil 20 to portion 32 and portion 33 of the leadframe 30 to be formed into two electrodes;
c. manufacturing and molding the magnetic plastic packaging layer 40 on the periphery of the coil 20;
d. curing the magnetic plastic packaging layer 40 through heat treatment; and
e. carrying out leadframe cutting on the cured semi-finished product to form the two electrodes exposed outside the magnetic plastic packaging layer 40, and bending the two electrodes to extend to the surface of the magnetic plastic packaging layer 40 flatly to obtain the inductive component.

In a preferred embodiment, in step b, the insulating layer 12 and the self-adhesive layer 13 of the leading-out terminal of the coil 20 are removed by means of laser scanning, and then the leading-out terminal of the coil 20, and the portion 32 and portion 33 of the leadframe to be formed into two electrodes are welded by means of laser spot welding. FIG. 3 is a schematic view of a hollow coil welded to a leadframe according to an embodiment provided by the present invention. Preferably, the leadframe is a laser melting leadframe. The leadframe is coated around the leading-out terminal of the coil 20 prior to welding.

In another preferred embodiment, in step b, the leadframe is provided with an ox-horn locking groove, the insulating layer 12 and the self-adhesive layer 13 of the leading-out terminal of the coil 20 are removed by means of laser scanning, then the leading-out terminal of the coil 20 is implanted into the ox-horn locking groove of the leadframe, and then the blade of the ox-horn locking groove is bent by mechanical pressure to wrap the leading-out terminal of the coil 20.

In a preferred embodiment, in step c, the magnetic plastic packaging layer 40 is formed by molding or gluing. More preferably, the molding is by transfer molding.

In a preferred embodiment, in step c, the forming pressure is below 300 MPa. In a preferred embodiment, in step d, baking is carried out at a temperature above 100° C. for 1-5 hours. FIG. 4 is a schematic view showing a semi-finished product of a hollow coil 20 of Litz wire 10 after molding according to an embodiment provided by the present invention.

In some embodiments, the power inductor comprises a coil 20 wound by self-adhesive Litz wire 10 and a magnetic plastic packaging layer covering the Litz wire 10 coil 20, and two electrodes connected to the leading-out terminal of the Litz wire 10 coil 20 are exposed outside the magnetic plastic packaging layer. The coil 20 is wound by using a plurality of helically twisted Litz wires 10 instead of conventional round wire or flat wire. Each of the Litz wires 10 may be composed of a plurality of self-adhesive wires insulated from each other and helically twisted. The magnetic plastic packaging layer comprises magnetic powder particles, an organic adhesive, a lubricant, and a curing agent. The magnetic plastic packaging layer is formed by molding or gluing.

In some embodiments, a manufacturing method for a power inductor comprises the following steps:

simulating the high-frequency loss of the Litz wire 10 by using the ANSYS software, and determining the nominal diameter of a single wire, the number of a single wire or bundles, the lay length, the twisting structure, and the winding mode of the Litz wire 10;

removing the insulating layer 12 and the self-adhesive layer 13 of the Litz wire 10 by laser scanning, and welding the Litz wire 10 and the leadframe by laser spot welding;

forming a magnetic plastic packaging layer on the periphery of the winding of the coil 20 through a molding process or gluing, wherein the molding pressure is lower than 300 MPa, and then baking is carried out to cure the organic component of the plastic packaging layer;

and cutting and folding the cured semi-finished product to obtain a finished product.

In some embodiments, a power inductance element includes a coil 20 wound by Litz wire 10, two leadframes connected to the leading-out terminal of the Litz wire 10 coil 20, and a magnetic plastic packaging layer covering the coil 20 and the leadframe (excluding the electrode portion).

Specifically, the center pillar structure of the hollow coil 20 may be a circular shape, an oval shape, or a runway shape, the Litz wire 10 may be a USTC, a film wrapping, and an extruded Litz wire 10, the Litz wire 10 may have a cross section of a circular shape, a square shape, a rectangular shape, etc., and the twisting mode may be a single-twisted type, a multiple-twisted type, preferably a self-adhesive Litz wire 10.

Specifically, the magnetic plastic packaging layer is formed by molding or gluing.

Specifically, the magnetic plastic packaging layer comprises magnetic powder particles, an organic adhesive, a lubricant, and a curing agent, wherein the material of the magnetic powder particles comprises any one or more of Mn—Zn, NiZn, carbonyl iron powder, iron-nickel alloy, FeSi, FeSiCr, FeSiAl, molybdenum permalloy, nanocrystalline and amorphous materials. The organic adhesive comprises any one or more of epoxy, silicon resin, furfural resin, polyimide, polyphenylene sulfide, and melamine resin. The lubricant comprises any one or more of stearic acid, aluminum stearate, magnesium stearate, calcium stearate, and zinc stearate. Preferably, the curing agent is an amino resin.

In some embodiments, a manufacturing method for a power inductance element comprises the following steps:

winding a coil: winding a coil 20 by using a plurality of mutually helically twisted and mutually insulated Litz wires 10;

removing the insulating layer 12 and the self-adhesive layer 13 of the Litz wire 10 by means of laser scanning, then welding the Litz wire 10 and the leadframe by means of laser spot welding, preferably coating the pin of the Litz wire 10 by means of a laser melting leadframe or adopting a locking groove design for the ox-horn of the leadframe, then after removing the self-adhesive layer 13 of the Litz wire 10 by means of laser scanning, implanting the pin of the Litz wire 10 into the ox-horn locking groove of the leadframe, and then bending the blade of the locking groove of the leadframe by means of mechanical pressure, and wrapping the pin of the Litz wire 10;

coating a hollow coil 20 and a leadframe weld fillet by adopting a transfer molding process, and exposing an electrode portion of the leadframe connected with the coil 20 outside the magnetic plastic packaging layer;

heat treatment: curing the plastic packaging layer;

and cutting, bending, trimming and leveling the electrode to obtain a finished product.

A specific manufacturing procedure of a power inductor of a typical embodiment is described below with reference to the accompanying drawings.

1) Determining a Litz Wire Structure

The nominal diameter of a single wire, the number of a single wire or bundles, the lay length, and the twisting structure of the Litz wire are determined through simulation (the simulation software is preferably ANSYS). FIG. 1 shows a schematic cross-sectional view of a Litz wire that can be self-adhibited with hot air according to an embodiment. Litz wire 10 is formed by twisting a copper conductor 11, an insulating layer 12 coated on the outer surface of the copper conductor 11, and a self-adhesive layer 13 coated on the surface of the insulating layer 12. The insulating layer 12 is a primer layer such as polyurethane, polyester, or polyester imine, and the self-adhesive layer 13 is a polyimide self-adhesive layer or a polyamide self-adhesive layer. In the embodiment, the number of strands of the Litz wire is 7; the copper conductor 11 has a diameter of 0.20 mm, the insulating layer 12 has a single side thickness of 1-5 μm, and the self-adhesive layer 13 has a single side thickness of 0.8-3.0 μm.

2) Manufacturing a Hollow Coil

As shown in FIG. 2, hollow coil 20 is formed by the opposing winding of the Litz wire 10, the hollow coil 20 comprises a first coil layer 21 and a second coil layer 22, the first coil layer 21 and the second coil layer 22 are overlapped with each other, and the winding directions of the first coil layer 21 and the second coil layer 22 are opposite.

3) Welding the Electrode

The insulating layer 12 and the self-adhesive layer 13 of the Litz wire are removed by laser scanning, weld fillet 31 of leadframe 30 is melted by adjusting parameters such as laser power and focal length, leading-out terminal 23 and leading-out terminal 23' of the coil 20 are coated, and a welding assembly for welding the hollow coil and the leadframe is as shown in FIG. 3.

4) Molding

The coil and leadframe are transferred to an injection molding frame, the coil and leadframe (except an electrode portion) are coated on a magnetic plastic packaging layer 40 by adopting an injection molding process, the magnetic powder contained in the magnetic plastic packaging layer is FeSiCr metal soft magnetic powder subjected to passivation and insulation treatment, the molding pressure is less than 100 MPa, and the magnetic conductivity ui is 20-35; a molded semi-finished product is obtained by demoulding, and the molded semi-finished product is baked for 1-5 hours at a temperature of 100° C. or higher to cure the organic ingredients of the plastic packaging layer.

5) Electrode Forming

The semi-finished product obtained in step 4) is implanted into a cutting device for cutting the leadframe to form a single cut semi-finished product. The portion comprising portions of the leadframe 30 for forming side surface electrode and bottom surface electrode respectively is bent, the leadframe is folded into electrode groove 41 and electrode groove 42, the leadframe in the electrode groove 41 and electrode groove 42 is leveled, and finally, a finished product is manufactured. As shown in FIG. 5, the finished product of the example includes coil 20, electrode 50, electrode 60, and magnetic plastic packaging layer 40.

Table 1 is the ACR comparative data of the molded power inductor at different frequencies. The molded power inductor is molded by winding the hollow coil with Litz wire, round wire, and flat wire, respectively.

TABLE 1

| | L | Isat | DCR | ACR (mΩ) | | | |
|---|---|---|---|---|---|---|---|
| Wire Winding Mode | (uH) | (A) | (mΩ) | 100 KHz | 200 KHz | 500 KHz | 1 MHz |
| Round Wire Flying Fork | 1.01 | 18.2 | 7.65 | 15.30 | 25.80 | 43.67 | 63.77 |
| Stranded Wire Flying Fork | 1.01 | 18.2 | 10.43 | 11.50 | 12.38 | 17.19 | 29.27 |
| Flat Wire Opposing Winding | 0.99 | 18.24 | 5.91 | 10.30 | 16.72 | 27.78 | 37.70 |
| Flat Wire Lap Winding | 1.08 | 18.38 | 6.5 | 9.25 | 14.89 | 30.96 | 48.23 |

The background section of the present invention may contain background information regarding the problems or environments of the present invention and does not necessarily describe the prior art. Accordingly, the content contained in the background art section is not an admission of the prior art by the applicant.

The foregoing is a further detailed description of the invention in connection with specific/preferred implementations, and is not to be construed as limiting the invention to such specific instances. For those of ordinary skills in the technical field to which the present invention belongs, without departing from the concept of the present invention, several substitutions or modifications can be made to the described implementations, and these substitutions or modifications should be regarded as belonging to the protection scope of the present invention. In the illustration of the description, the reference to the description of the terms "an embodiment", "some embodiments", "preferred embodiments", "example", "specific example", or "some examples", etc., means that a particular feature, structure, material, or feature described in connection with the embodiment or example is included in at least one embodiment or example of the invention. In the present description, schematic representations of the above terms are not necessarily directed to the same embodiments or examples. Furthermore, the particular features, structures, materials, or characteristics described may be combined in any one or more embodiments or examples in a suitable mode. Various embodiments or examples and features of various embodiments or examples described in the description may be incorporated and combined by those skilled in the art without contradicting each other. Although embodiments of the present invention and advantages thereof have been described in detail, it should be understood that various changes, substitutions, and alterations can be made herein without departing from the scope of the patent application.

What is claimed is:

1. An inductive component, comprising a coil having a hollowed central portion wound by Litz wire, a magnetic plastic packaging layer covering the coil, and a first electrode and a second electrode which are respectively connected to a first leading-out terminal and a second leading-out terminal of the coil, wherein the first electrode and the second electrode are exposed outside the magnetic plastic packaging layer, wherein the magnetic plastic packaging layer comprises a top surface, a bottom surface, and opposing first side surface and second side surface, an axial direction of the central portion of the coil is perpendicular to the top surface and the bottom surface, and parallel to the first side surface and the second side surface, wherein the first electrode is connected to the first leading-out terminal of the coil by penetrating through the first side surface, the second electrode is connected to the second leading-out terminal of the coil by penetrating through the second side surface, the first electrode extends downwards on the first side surface to form a side surface electrode portion of the first electrode and is bent to extend on the bottom surface to form a bottom surface electrode portion of the first electrode, and the second electrode extends downwards on the second side surface to form a side surface electrode portion of the second electrode and is bent to extend on the bottom surface to form a bottom surface electrode portion of the second electrode; wherein the bottom surface of the magnetic plastic packaging layer is formed with a first bottom surface electrode groove and a second bottom surface electrode groove, wherein the bottom surface electrode portion of the first electrode is accommodated in the first bottom surface electrode groove, and the bottom surface electrode portion of the second electrode is accommodated in the second bottom surface electrode groove, thereby keeping the magnetic plastic packaging layer flat with the first electrode and the second electrode, wherein the Litz wire is formed by twisting a plurality of self-adhesive wires insulated from each other, and the self-adhesive wire comprises a copper conductor, an insulating layer coated on a surface of the copper conductor, and a self-adhesive layer coated on an outer surface of the insulating layer; the insulating layer is a polyurethane, polyester or polyester imide primer layer; the self-adhesive layer is a polyimide self-adhesive layer or a polyamide self-adhesive layer; wherein the number of strands of the Litz wire is 7; the copper conductor has a diameter of 0.20 mm, the insulating layer has a single side thickness of 1-5 μm, and the self-adhesive layer has a single side thickness of 0.8-3.0 μm.

2. The inductive component of claim 1, wherein the coil is formed by opposing winding of the Litz wire, the coil comprises a first coil layer and a second coil layer, the first coil layer and the second coil layer are arranged to overlap each other.

3. The inductive component of claim 1, wherein the magnetic plastic packaging layer comprises magnetic powder particles, an organic adhesive, a lubricant and a curing agent; the magnetic powder particles comprise particles of any one or more of Mn—Zn, NiZn, carbonyl iron powder, Fe—Ni, FeSi, FeSiCr, FeSiAl, molybdenum permalloy, nanocrystalline and amorphous materials, and particle size of the magnetic powder particles is 1-50 μm; the organic adhesive comprises any one or more of epoxy resin, silicon resin, furfural resin, polyimide, polyphenylene sulfide and melamine resin; the lubricant comprises any one or more of stearic acid, aluminum stearate, magnesium stearate, calcium stearate and zinc stearate; the curing agent is amino resin.

4. The inductive component of claim 1, wherein the inductive component is a cube.

5. A manufacturing method for the inductive component of claim 1, comprising following steps:

a. winding a hollow coil by using Litz wire, wherein the Litz wire is formed by twisting a plurality of self-adhesive wires insulated from each other, and the self-adhesive wire comprises a copper conductor, an insulating layer coated on a surface of the copper conductor, and a self-adhesive layer coated on an outer surface of the insulating layer; the insulating layer is a polyurethane, polyester or polyester imide primer layer; the self-adhesive layer is a polyimide self-adhesive layer or a polyamide self-adhesive layer; wherein the number of strands of the Litz wire is 7; the copper conductor has a diameter of 0.20 mm, the insulating layer has a single side thickness of 1-5 μm, and the self-adhesive layer has a single side thickness of 0.8-3.0 μm;

b. connecting two leading-out terminals of the coil to portions of the sheet to be formed into two electrodes;

c, manufacturing and molding a magnetic plastic packaging layer on the periphery of the coil;

d. curing the magnetic plastic packaging layer through heat treatment; and e. carrying out sheet cutting on a cured semi-finished product to form the two electrodes exposed outside the magnetic plastic packaging layer, and bending the two electrodes to extend to the surface of the magnetic plastic packaging layer flatly to obtain the inductive component.

6. The manufacturing method for the inductive component of claim 5, wherein in step b, an insulating layer and a self-adhesive layer of the leading-out terminal of the coil are removed by means of laser scanning, and then the leading-out terminal of the coil and the portions of the sheet to be formed into two electrodes are welded by means of laser spot welding; the sheet adopts a laser melting sheet, and the sheet is coated on the leading-out terminal of the coil before welding; or in step b, the sheet is provided with an ox-horn locking groove, the insulating layer and self-adhesive layer of the leading-out terminal of the coil are removed by means of laser scanning, then the leading-out terminal of the coil is implanted into the ox-horn locking groove of the sheet, and then the blade of the ox-horn locking groove is bent by mechanical pressure to wrap the leading-out terminal of the coil.

7. The manufacturing method for the inductive component of claim 5, wherein in step c, the magnetic plastic packaging layer is formed by molding or gluing, the molding is transfer molding.

8. The manufacturing method for the inductive component of claim 5, wherein in step c, the molding pressure is less than 300 MPa; in step d, baking is carried out for 1-5 hours at a temperature above 100° C.

* * * * *